United States Patent [19]

Ceintrey

[11] 4,120,832

[45] * Oct. 17, 1978

[54] PROCESS FOR THE PREPARATION OF A COATING COMPOSITION FOR ROADS, AIRPORTS AND INDUSTRIAL FLOORINGS

[75] Inventor: Marcel Ceintrey, Marly Le Roi, France

[73] Assignee: Screg Routes et Travaux Publics, Paris, France

[ * ] Notice: The portion of the term of this patent subsequent to Apr. 27, 1993, has been disclaimed.

[21] Appl. No.: 627,471

[22] Filed: Oct. 30, 1975

[30] Foreign Application Priority Data

Nov. 8, 1974 [FR] France ................................ 74 37158

[51] Int. Cl.[2] ........................ C08J 11/04; C08L 27/06; C08L 95/00

[52] U.S. Cl. ................................ 260/2.3; 260/28.5 A; 260/28.5 AS; 260/28.5 D; 260/998.19

[58] Field of Search .................. 260/28.5 D, 28.5 AS, 260/28.5 A, 2.3

[56] References Cited

U.S. PATENT DOCUMENTS

| | | | |
|---|---|---|---|
| 3,549,575 | 12/1970 | Payne et al. | 260/28.5 D |
| 3,654,217 | 4/1972 | Cerri | 260/28.5 D |
| 3,953,390 | 4/1976 | Ceintry | 260/28.5 D |

FOREIGN PATENT DOCUMENTS

| | | | |
|---|---|---|---|
| 1,383,140 | 4/1964 | France | 260/28.5 |
| 1,575,668 | 8/1969 | France | 260/28.5 |
| 7,305,619 | 10/1974 | Netherlands | 260/28.5 A |
| 726,816 | 3/1955 | United Kingdom | 260/28.5 D |

*Primary Examiner*—Allan Lieberman
*Attorney, Agent, or Firm*—Wenderoth, Lind & Ponack

[57] ABSTRACT

This invention relates to a coating composition for roads, airports, industrial floorings, canals and dams comprising inorganic granulates coated with 4–12 wt%, by weight of the granulates, of 25°–60° EVT pitch and with 5–30 wt%, by weight of the coal pitch, of ground waste plastic materials, to a process for its preparation and to the coatings obtained thereby.

The coatings of this invention possess good resistance to furrowing and to punching.

4 Claims, No Drawings

PROCESS FOR THE PREPARATION OF A COATING COMPOSITION FOR ROADS, AIRPORTS AND INDUSTRIAL FLOORINGS

This invention relates to a new coating composition suitable for pavements, particularly for roads, airports, canals, dams and industrial floorings comprising inorganic granulates and a tar or pitch binder; it relates also to a process for the preparation of said composition and to the coatings obtained therefrom.

The hot-laid asphalt-concrete pavement surface layers have attained widespread acceptance in recent years and have achieved a high level of development with respect to properties such as roughness, tightness and resistance to heavy traffic.

Said surface layers are produced by conventional methods comprising coating a mixture of inorganic granulates, sand and filler, at temperatures between 120° and 180° C., with petroleum asphalt having a penetration of from 80/10 to 30/10 mm, the tendency being to use increasingly hard asphalts, such as those of 40–50 and even 20–30 type, and then laying out the resulting concrete.

This tendency results from the difficulty encountered with this type of material to provide good furrowing resistance to pavements submitted to channeled traffic.

When the slopes reach 6%, the problem becomes practically impossible to solve, even with the hardest asphalts. Also, when this type of material is used to produce industrial floorings, the static loads exerting ground pressures in excess of 15 kg/cm$^2$ lead to substantial punching of up to several millimeters.

Therefore, Applicant has developed processes to improve matters, described particularly in French Pat. No. 1,575,668 and French Patent Application No. 73 16 935 which disclose the use of coal pitch with added polyvinyl chloride.

Said processes provide a substantially improved furrowing resistance with respect to the conventional techniques and punching resistance values within a range of from 15 to 25 kg/cm$^2$ which, however, are still unsatisfactory.

The object of the present invention is to overcome the aforesaid drawbacks and to provide a new coating composition resistant to furrowing and to punching, at lower cost.

Thus, the present invention relates to a coating composition useful for roads, airports, industrial floorings, canals and dams, comprising inorganic granulates coated with 4–12 wt%, by weight of the granulates, of 25°–60° EVT pitch and with 5–30 wt%, by weight of the coal pitch, of ground waste plastic material.

The invention relates also to a process for the preparation of the above defined coating composition, comprising admixing pre-ground waste plastic materials with inorganic granulates heated at a temperature of 120°–150° C. and below the decomposition temperature of the plastic materials, during a period of time of less than 30 seconds, then adding the heated pitch at a temperature of about 120° C. to about 140° C., and then mixing all the above ingredients to initiate the plasticizing of the waste materials and to coat the granulates.

The invention relates further to the coatings obtained from said composition.

Other features and advantages of this invention will become apparent from the detailed description which follows.

According to the invention, the coating composition consists essentially of inorganic granulates, of 4–12 wt% pitch, by weight of the granulates, and of ground waste plastic materials, the amount of said ground waste materials being 5–30 wt%, and preferably 15–20 wt%, by weight of the pitch.

The waste plastic materials used are preferably ground to a size less than 10 mm, advantageously to pass through a 4 mm mesh screen. Grinding to a size of less than 4 mm results in a reduced consumption of waste material with comparable results.

In fact, the waste material is ground to provide a good dispersion throughout the inorganic filler. Thus, the size to which the waste material is ground is not critical, but the smaller the size the better the dispersion and the faster the plasticizing with the pitch.

The waste plastic materials are, for example, waste packing materials, particularly polyvinyl chloride based bottles.

Among the waste packaging materials, those consisting of polyvinyl chloride with added impact-resistant styrene-butadiene-acrylonitrile resin materials give particularly satisfactory results, but the presence of a small amount, preferably less than 10%, of waste polyethylene plastic bottles does not affect the quality of the composition.

However, polyvinyl chloride waste materials are preferred and lead to extremely high strengths. As a matter of fact, those are the more commonly found materials.

The pitch used is preferably pitch obtained by distillation of tar resulting from high-temperature coke production.

Said pitch has EVT values (i.e., the temperature at which a binder has a viscosity of 50 s according to BRTA 10 mm) within the range from 25° to 60°, depending on the use intended for the desired hydrocarbonaceous concrete.

For industrial floorings, in which resistance to punching is particularly desirable, it is preferred to use 40°–55° EVT pitch.

For airports, it is preferred to use 35°–45° EVT pitch and for pavements, depending on the climate and the traffic conditions, it is preferred to select 30°–45° EVT pitch.

By the term "pitch", as used in the present specification, is meant both a product obtained by the distillation of coal which gives very good results and products resulting from a cracking process possessing comparable condensed aromatic hydrocarbon contents.

The inorganic granulates used are mixtures of conventional type comprising variously sized gravel, sand and fillers. In view of the exceptional degree of excellence of the binder of the present invention, however, one may contemplate not only the use of conventional continuous particle sizes composed of filler, sand and gravel, but also of less favorable materials which were not practicably useful heretofore, such as dune sand or river sand having a very narrow particle size range with which it is still possible to obtain a very high level of stability.

The process according to the present invention, for the preparation of the above-described composition, may be conducted as follows, for example.

Inorganic granulates are heated at a temperature of 120°–150° C. and are poured in a mixer into which are also added ground waste plastic packing materials.

The resulting admixture is mixed during a very short period of time (less than 30 seconds) after which the pitch heated at a temperature of about 120° C. to about 140° C. is added thereto and mixing is then continued for a period of time sufficient to plasticize the waste materials and coat the granulates.

The following non-limiting examples are given to illustrate the present invention.

EXAMPLE 1

Inorganic granulates consisting of 2–12 mm gravel (600 kg), 0.08–2 mm sand (300 kg) and of less than 0.08 mm limestone filler (100 kg) are heated in a conventional coating unit dryer at a temperature between 120° C. and 150° C. and are poured, at that temperature, into a mixer of the coating unit.

Ground waste plastic materials (25 kg) are then added, in a size such that the entire amount will pass through a 4 mm mesh screen.

The above ingredients are then mixed during about ten seconds after which 80 kg 42°–46° EVT coal pitch heated to 130° C. are immediately added and mixing is then continued for a further 40 seconds.

The resulting material, which is then at a temperature between 120° and 140° C., may be poured into a truck and used in conventional spreading machines, such as a finishing machine, for example, or may be spread by hand and compacted to a temperature of about 100° C. with conventional rollers, to give pavement surface layers having a thickness of 2–15 cm, for example.

The resulting surface layers have a particularly high strength and are entirely incommensurable with any of the heretofore known achievements in the flexible coating field.

On the other hand, the process is also more readily operated, the factors relating to temperature- and heating time-control requiring less narrow ranges than in the aforementioned processes.

The properties of the coating compositions are determined by means of the following determinations:

Duriez-type test bars are produced according to the procedure disclosed by the French Laboratoire Central des Ponts et Chaussees. Such test bars have a diameter of 80 mm and a height of about 10 cm. They are obtained by pressure molding the material at 120 kg/cm$^2$ and at 120° C.

The test bars are then maintained 7 days at room temperature, after which they are crushed at a temperature of 18° C., at a rate of 1 mm/second.

In the case of the conventional asphalt concretes mentioned, the strengths are within a range from 50 to 130 kg/cm$^2$.

In the processes described in French Pat. No. 1,575,668 and French Patent Application No. 73, 16935, the strengths are within a range from 100 to 250 kg/cm$^2$.

In the case of the present invention, the strengths are within a range from 450 to 600 kg/cm$^2$.

EXAMPLE 2

The following coating composition is prepared:

| | |
|---|---|
| 0.02 – 1 mm sea sand containing 3 wt% of less than 0.08 mm grains | 1000 kg |
| 40° EVT pitch | 45 kg |
| Waste polyvinyl chloride bottles containing impact-resistant resins | 12 kg |

The product is prepared according to the procedure described in Example 1, under the following conditions:

sand heated at 160° C.

waste materials mixed during 15 seconds addition of pitch heated at 130° C. and mixing during 45 seconds.

The resulting material, which may be used for very heavy traffic road foundations, has a compression strength of 40 atmospheres at 18° C., as determined by the above described testing procedure.

EXAMPLE 3

The following coating composition is prepared:

| | |
|---|---|
| 5/15 Gravel | 500 kg |
| 0/5 Crushed sand | 350 kg |
| 0 – 2 mm River sand | 200 kg |
| Filler | 50 kg |
| 30° EVT pitch | 80 kg |
| Waste polyvinyl chloride materials containing impact-resistant resins | 20 kg |

The product is prepared as described in Example 2. A compression strength of 200 atmospheres at 18° C., as determined according to the Duriez testing procedure, is obtained.

This product constitutes an excellent coating for airport runways.

Having now described my invention what I claim as new and desire to secure by Letters Patent is:

1. Process for preparation of a coating composition useful for roads, airports, industrial floorings, canals and dams, comprising inorganic granulates coated with 4–12 wt%, by weight of the granulates, of a 25°–60° EVT coal tar pitch, and with 5–30 wt%, by weight of the coal pitch, of ground waste plastic materials selected from the group consisting of waste polyvinyl chloride packaging material, waste polyvinyl chloride material used for the production of bottles and flasks, waste polyvinyl chloride material with added impact-resistant styrene-butadiene-acrylonitrile resin material and polyvinyl chloride waste material containing up to 10 wt% waste polyethylene, and having a particle size of less than 10 mm, comprising admixing pre-ground waste plastic materials with inorganic granulates heated at a temperature of 120°–150° C. and below the decomposition temperature of said plastic materials, during a period of time of less than 30 seconds, then adding the pitch heated at a temperature of about 120° C. to about 140° C., and mixing said ingredients during a period of time sufficient to initiate the plasticizing of the waste material and coat the granulates.

2. Process as claimed in claim 1, wherein the plastic waste material is ground to a particle size of less than 4 mm.

3. Process as claimed in claim 1, wherein said pitch is 30°–55° EVT coal pitch.

4. Process as claimed in claim 1, wherein said granulates consist of a mixture of gravel, sand and filler.

* * * * *